(12) United States Patent
Roseth et al.

(10) Patent No.: US 11,200,394 B1
(45) Date of Patent: Dec. 14, 2021

(54) METHOD OF CUSTOMER ASSISTANCE THROUGH ASSOCIATING A WATER CARE DEALER WITH A WATER CARE CUSTOMER

(71) Applicant: King Technology Inc., Hopkins, MN (US)

(72) Inventors: Randy Roseth, Chanhassen, MN (US); Jackie Rieck, Waconia, MN (US); Bryan Wall, Minnetonka, MN (US)

(73) Assignee: KING TECHNOLOGY INC., Hopkins, MN (US)

( * ) Notice: Subject to any disclaimer, the term of this patent is extended or adjusted under 35 U.S.C. 154(b) by 0 days.

(21) Appl. No.: 16/873,774

(22) Filed: Jun. 29, 2020

Related U.S. Application Data

(60) Provisional application No. 62/922,030, filed on Jul. 19, 2019.

(51) Int. Cl.
*G06K 7/14* (2006.01)
*G06Q 20/30* (2012.01)

(52) U.S. Cl.
CPC ........... *G06K 7/1417* (2013.01); *G06Q 20/30* (2013.01)

(58) Field of Classification Search
CPC .............................. G06Q 20/30; G06K 7/1417
USPC .................................................. 235/380, 375
See application file for complete search history.

(56) References Cited

U.S. PATENT DOCUMENTS

2012/0191566 A1* 7/2012 Sayan ................ G06Q 30/0633
705/26.8

\* cited by examiner

*Primary Examiner* — Toan C Ly
(74) *Attorney, Agent, or Firm* — Johnson & Phung LLC

(57) ABSTRACT

A method of assisting a customer to obtain water care information and products by associating the customer with water care dealer through a supplier-associated app where the water care dealer is identifiable through a QR Code.

17 Claims, 3 Drawing Sheets

METHOD OF CUSTOMER ASSISTANCE THROUGH ASSOCIATING A WATER CARE DEALER WITH A WATER CARE CUSTOMER

CROSS REFERENCE TO RELATED APPLICATIONS

This application claims priority from provisional application 62/922,030 filed Jul. 19, 2019.

STATEMENT REGARDING FEDERALLY SPONSORED RESEARCH OR DEVELOPMENT

None

REFERENCE TO A MICROFICHE APPENDIX

None

BACKGROUND OF THE INVENTION

Description of the Prior Art

The art is replete with water purification materials for use in recreational waters that can be used to effectively maintain an acceptable bacterial count in a pool or spa while also having a desirable effect of maintaining a low level of chlorine in the pool or spa. One of the difficulties for a pool or spa owner is that the art is also replete with recommendations of various groups as to when and how to maintain the pool or spa, which may vary due to the type of water purifications materials used in the pool or spa as well as the contents of the water used in the pool or spa. In some cases the art may conflict with recommendations from the water care supplier or the manufacturer of the water purification materials, which may lead to improper maintenance of the pool or spa.

For example, one manufacturer makes an effective water purification material as shown in U.S. Pat. No. 9,187,351, which describes a method for maintaining a body of water in a sanitized condition that uses "A sanitizing agent for maintaining a biocidal effective bacteria count in a body of water comprising a metal ion donor for donating a metal ion and a compound containing a hydantoin ring with the combination of the compound containing the hydantoin ring with the metal ion donor enhancing the effectiveness of the sanitizing agent to enable the sanitizing agent to maintain a biocidal effective bacteria count in the body of water where the sanitizing agent may be added to the body of water in solid or nonsolid form." Other manufacturers may use different water purification materials that require different types of water treatment compositions leading to conflicting information on maintaining the body of recreational body of water if one product follows another.

While a manufacturer or water care supplier typically provides instructions on proper use of water purification materials other groups may recommend using water purification materials not recommend by the manufacturer or water care supplier. Following the procedure from one manufacturer or one water care supplier provides a safe procedure to maintain a body of recreational water such as a pool or spa in a safe user-friendly condition since the knowledge of prior use as well as location of the pool or spa can be considered. Unfortunately, if a customer inadvertently uses incompatible water treatment materials from other water care dealers or suppliers or is mislead into using water treatment from a different water care supplier there may be adverse effects that unknowingly affect the condition of the body of recreational water.

The problem in obtaining proper maintenance information for a body of recreational water is compounded by the existence of the Internet since consumers often seek quick answers from Internet sources. Oftentimes Internet sources do not have reliable or proper maintenance instructions. Another difficulty for the consumer is the Internet may list counterfeit water purification materials for sale. There is a need to assist the customer so the customer obtains correct and current information on water purification materials as well ensuring that the water purification materials the customer obtains are not counterfeit water purification materials.

SUMMARY OF THE INVENTION

A method of assisting a customer that purchases and uses water care compositions or services for maintaining a pool or spa by identifying each water care dealer with a unique quick response code (QR Code hereinafter) so that when the water care dealer QR Code is scanned into a mobile processor of a customer the customer becomes associated with the water care dealer through the water care dealer QR Code and a downloadable supplier-associated app. Once the customer is associated with the water care dealer the customer has access to information from both a supplier of water care products and the water care dealer, which ensures that the customer obtains proper information on water care compositions, for example the customer may obtain information based on the type of water care compositions that were previously added to the body of recreational water in the geographical area of the customer. In addition, the method also assists the customer in avoiding counterfeit water care compositions that may be available on the Internet. In one example the water care dealer QR Code, which is unique to a specific water care dealer, is posted at the store of a brick and mortar water care dealer and in other cases the water care dealer QR Code, which is associated with a specific water care dealer, is applied to a handout or brochure that may be supplied to the customer by the water care dealer. In the method described herein the customer is instructed to scan the water care dealer QR Code as opposed to a product QR Code into his or her mobile processor and download a supplier-associated app that allows the customer to easily obtain information on how the water care dealer, which has been identified by the unique QR Code, can assist the customer with the proper care and maintenance of his or her body of recreational water as well as assist the customer when future water care products or services are needed.

DESCRIPTION OF THE PREFERRED EMBODIMENT

Figure 1:
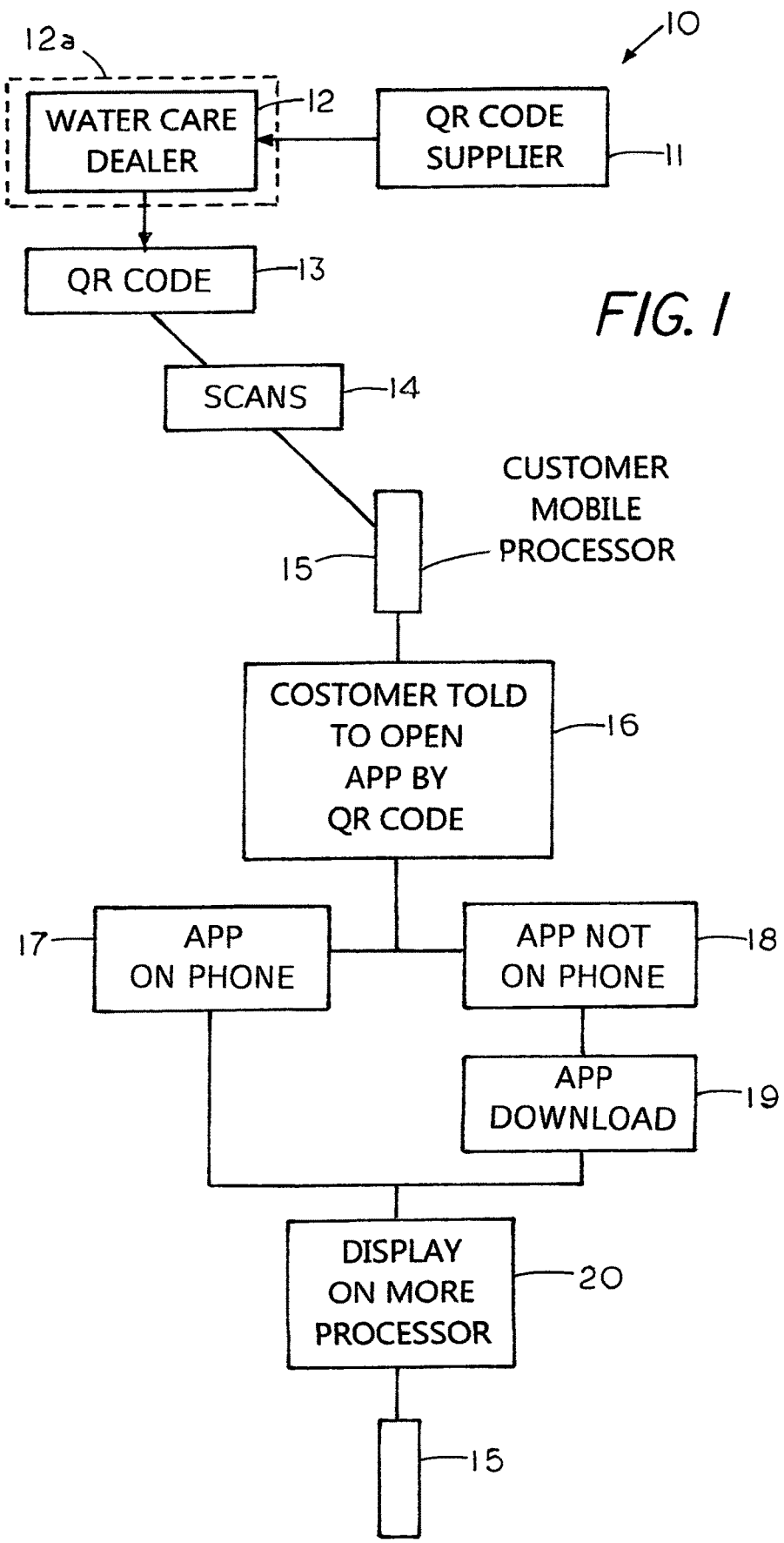
FIG. 1 is a diagram of an example of a method for associating a brick and mortar water care dealer with a customer where the brick and mortar water care dealer is identified through a unique QR Code.

FIG. 1 is a diagram of an example of a method for associating a customer with a water care dealer 12, who sells water care products and services, where the water care dealer of water care products and services is located in a brick and mortar store 12a. Typically, the customer and the water care dealer are located in the same geographical area enabling the customer to enter the brick and mortar store 12a and purchase necessary products or services. In supplying products or services the water care dealer invests time to provide the customer with information on the use of the water care product or services, which may be unique to the customers recreational water facilities as well as unique to the geographical area of the customer and the water care dealer. For example, a pool owner who has an outdoor pool in a northern state may require different water care products or different amounts of water care products then a person that has an outdoor pool in a southern state.

Typically, a water care dealer provides customer information on maintaining recreational waters, such as pools or spas with an initial sale of water care products or services in order to assist the customer in pool or spa set up as well as assist the customer in the maintenance of a pool or spa with no obligation on the customer but with an expectation that the customer will have an ongoing relationship with the water care dealer. However, in the existing commercial environment there are multiple opportunities for the customer to purchase water care products and water care services from online vendors who may not be aware of regional aspects of maintaining a pool or spa as well as other customer needs that should to be taken into consideration when purchasing a water care product or water care service.

After the customers initial purchase of water care products or services further water care products and services may not be needed for weeks or months. When it becomes time to reorder or require future water care assistance the customer may have forgotten where to obtain proper water information and the importance of obtaining correct water care products and information as well as when and how to use various water products when there have been significant events that may affect the body of recreational water based on use and the environment where the body of recreational water is located. If the customer is not up to date on the changing needs of the body of recreational water the customer may resort to using a different supplier to obtain additional water care products since it may be convenient to order water products on the Internet. Unfortunately, both the customer and the water care dealer may be adversely affected by such action, the water care dealer by not obtaining further business and the customer by not obtaining geographical or other relevant information on maintaining his or her body of recreational water, for example the recreational water in the customer's swimming pool or hot tub.

As described herein different water care products may be required for an outdoor swimming pool that is located in a northern USA climate as opposed to an outdoor swimming pool that is located in a southern USA climate. In the method described herein each local water care dealer 12, which is a brick and mortar business, is assigned a unique QR Code by the water care supplier that sells the water care products to the water care dealer for resale to the public. Typically, the water care supplier sells water care products to multiple water care dealers that may be located either inside or outside of the United States of America. By assigning a unique QR Code for each water care dealer that receives water care products from the water care supplier enables the QR Code to function both as an identifier of each of the water care dealers to the water care supplier as well as creates the ability to link a customer at his or her geographical location to the water care products needed at that location. This linking assures that appropriate water supplies can be obtained by the customer through a supplier-associated app, which is downloaded onto the mobile processor of a customer.

The method described herein makes it possible for the water care dealer to assist a customer in the maintenance of his or her pool with the most relevant material as well as uniquely linking the customer to the water care dealer. That is, in this example the water care supplier uses a downloadable supplier-associated app to link a customer to the water care dealer when the customer downloads the dealer QR Code as well as the water care dealer to the water care supplier. Because the QR Code of each water care dealer is different the customer becomes automatically linked to the local water care dealer through the water care dealer QR Code and the supplier-associated app. Although if desired the customer has the option to link to a different water care dealer. The method may include generating a unique QR Code that not only identifies the water care dealer the unique QR Code may also include a URL of the water care dealer, however, a main purpose is to assign each water care dealer with a unique QR Code so that when coupled with a supplier-associated app the water care customer obtains geographical relevant assistance to the water care customer as well as allowing the water care customer to order water care products or services on the go.

The brick and mortar water care dealer, which has an ongoing local presence is not only familiar with the water care products and services needed in the geographical region of the brick and mortar water care dealer but is also knowledge of the types of water care products or services that are necessary for a pool or spa owner to maintain an outdoor pool or spa in the geographical region proximate the brick and mortar water care dealer. While a customer may make initial purchases of water care products or water care services from the brick and mortar water care dealer the customer may decide that when it comes time to ordering additional water care products that similar or identical water care products can more conveniently be purchased from an online supplier of general products. This type of situation may be adverse to both the customer and the brick and mortar business. For example, the customer loses since the customer may not obtain the correct product or correct instructions for his or her geographical region and the brick and mortar business loses sales, which are important to maintain the brick and mortar business. In the method described herein the water care dealer, which is typically a brick and mortar business, is placed on equal footing with online suppliers so that it becomes equally convenient for a customer to order a water care product from a local water care dealer that has a brick and mortar business as it is for the customer to order a water care product from an online supplier of water care products where the online purchased products may or may not be appropriate for the customer to maintain his or her body of recreational water such as a pool or spa.

In the method described herein and illustrated in FIG. 1 the brick and mortar water care dealer 12 obtains a unique QR Code. The QR Code may be assigned without the knowledge and consent of the water care dealer. If the water care dealer accepts the QR Code the unique QR Code 11 may be posted prominently at the brick and mortar business 12a or placed on a handout such as an information sheet 13 that is available from the water care dealer 12 located at the brick and mortar water business. The unique QR Code for the local brick and mortar business may be placed on other objects that a customer with a mobile processor 15, such as an iPhone, can on-the-go download the unique water care dealer QR Code of the brick and mortar business into the mobile processor of the customer.

In the method described herein, which is illustrated in FIG. 1, the water care dealer in the brick and mortar business obtains a unique water care QR Code 13, which identifies a specific water care dealer. In the next step the water care dealer makes the unique water care QR Code available to a water care customer and instructs the customer to scan 14 the water care dealer QR Code 13 into a customer's mobile processor 15. Once the water care dealer QR Code is scanned, the customer can open a supplier-associated app 16 that provide the customer with further information regarding water care products and water care services of the brick and mortar water care dealer 12.

In the method described herein when the water care dealer QR Code is scanned into the mobile processor the brick and mortar water care dealer 12 receives a notice that the customer has scanned the unique dealer QR Code 13 of the brick and mortar water care dealer into the mobile processor of the customer.

After scanning the unique QR Code 13 for the water care dealer of water care products or services into the mobile processor of the customer the customer is instructed to open a supplier-associated water care app 16 that appears on the screen of the mobile processor. If the supplier-associated water care app is already on the mobile processor 17 the customer is urged to open the supplier-associated water care app. If the supplier-associated water care app is not on the mobile processor 18 the supplier-associated water care app may be automatically downloaded 19 onto the customer's mobile processor 15. Once downloaded the customer is urged to open the supplier-associated water care app that appears on mobile processor, for example the FROG Water Care App. Once the supplier-associated water care app is downloaded a touchscreen appears that lists water care options that can be accessed from the mobile processor of the customer.

Figure 2:
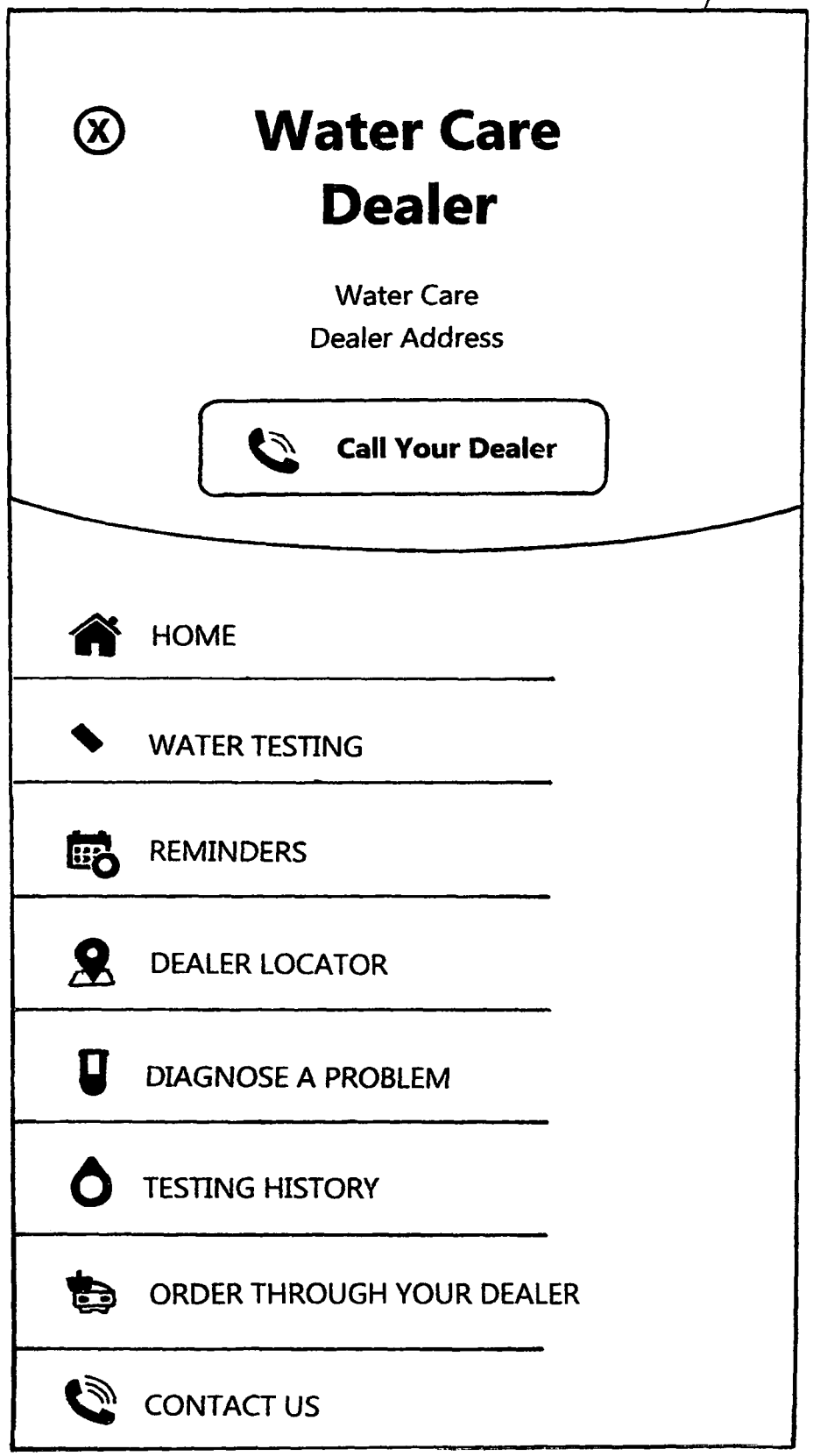
FIG. 2 shows an example of how a typical touch screen display might appear on the mobile processor of a customer after a supplier-associated app has been downloaded onto the mobile processor of the customer.

FIG. 2 shows an example of how a typical mobile processor touch screen 20 may appear. In this example the touch screen 30 displays the water care dealers name and address as well provides quick access to a list of product or services of the water care dealer. For example, water testing, reminders, water care dealer locators, diagnose a problem, testing history, order through your water care dealer and contact us.

Figure 3:
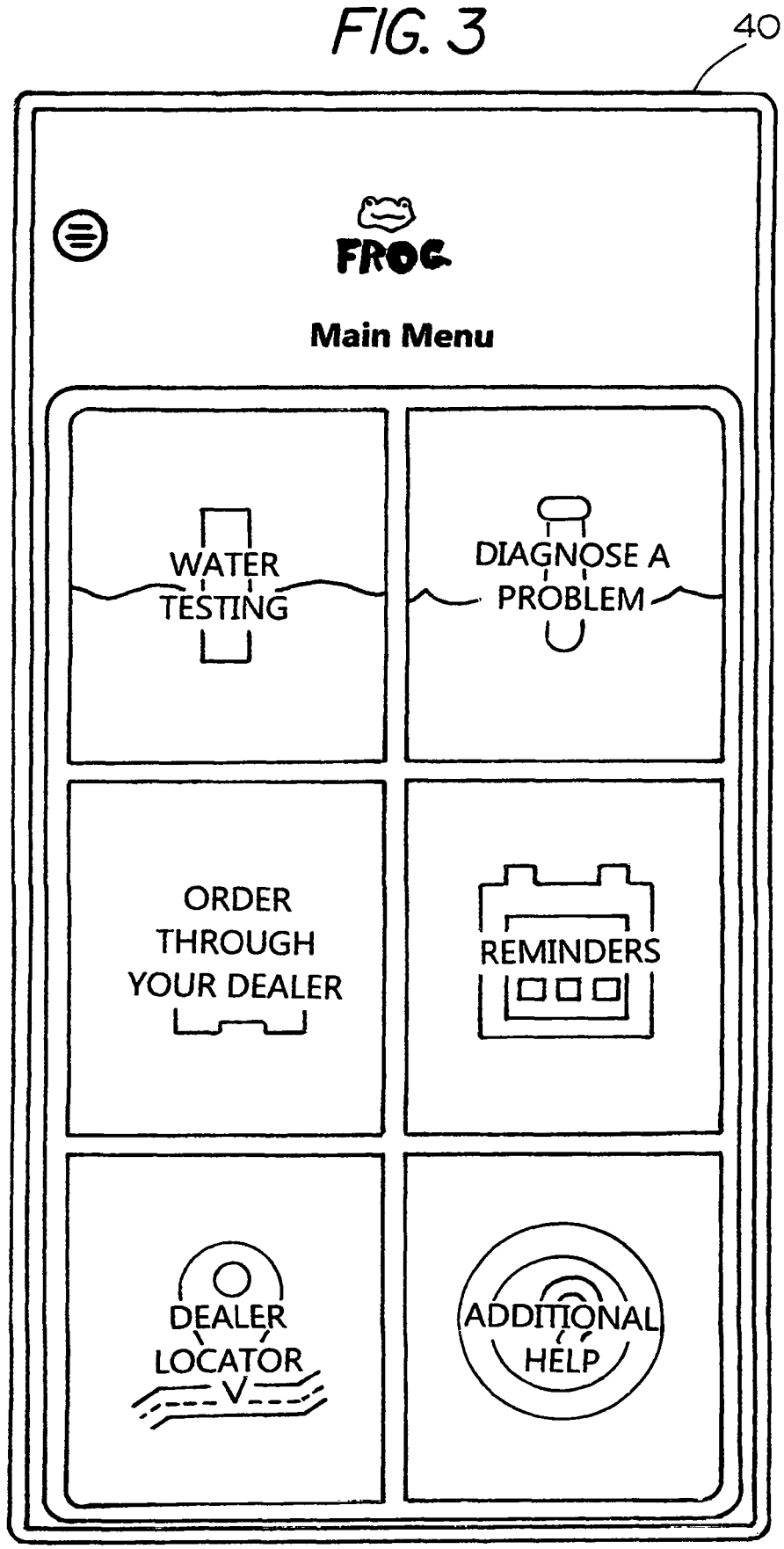
FIG. 3 shows another example of how a different touch screen display might appear on the mobile processor of a customer after a supplier-associated app has been downloaded onto the mobile processor of the customer.

FIG. 3 is another example of how a mobile processor touch screen 30 may appear to a user as well as typical actions available to the customer. In either case the mobile processor can be used to obtain water care information or water care products and services from the water care dealer who maintains a brick and mortar water care business.

As described herein the invention comprise a method for assisting a customer in maintaining a body of recreational water by generating a QR Code for each water care dealer that sells a product obtained from a water care supplier where a separate QR Code is used to identify each water care dealer. The customer is asked to scan the QR Code for a specific water care dealer into a mobile processor of the customer and then download a water care supplier-associated app onto the mobile processor of the customer. Once a screen with water care information is displayed on a touch screen of the mobile processor the customer can order a water care product through the touch screen on the mobile processor of the customer with assurances that the water care product is a legitimate and correct product.

We claim:

1. A method for assuring a water care customer obtains geographical relevant assistance and avoiding counterfeit water care compositions and conflicting water instructions by associating a water care customer with a water care supplier through a water care dealer where the water care dealer is located in a brick and mortar store having products or services that are necessary for a pool or spa owner to maintain an outdoor pool or spa in a geographical region proximate the water care dealer comprising:

a water care supplier assigning a unique QR Code for each water care dealer that receives a water care product from the water care supplier where the unique QR Code identifies a specific water care dealer where the water care customer can obtain an appropriate water care product for a geographical region of the water care customer;

a water care dealer suggesting to the water care customer to scan the unique QR Code for the water care into a mobile processor of the water care customer;

scanning the unique QR Code of the water care dealer into the mobile processor of the water care customer by the water care customer;

receiving an indication from the water care customer that the water care customer has scanned the QR Code for the water care dealer into the mobile processor of the water care customer;

instructing the water care customer to download a water care supplier-associated app if the water care supplier-associated app is not on the mobile processor of the water care customer;

opening the water care supplier-associated app on the mobile processor of the customer;

using the water care supplier-associated app on the mobile processor of the customer to associate the water care customer with the water care dealer;

displaying water care information on water care products and services from the water care dealer that maintains a brick and mortar water care business on the supplier-associated app on the mobile processor;

displaying the water care information as a set of touch screen functions on a touch screen of the mobile processor of the water care customer; and transmitting an instruction to the water care dealer through the touch screen on the mobile processor of the water care customer.

2. The method of claim 1 where the supplier-associated app displays actions performable by the water care dealer including ordering a product from the water care dealer.

3. The method of claim 1 wherein the supplier-associated app is a Frog Water Care APP.

4. The method of claim 3 where the customer orders water care product through the Frog Water Care app.

5. The method of claim 1 wherein the touch screen displays the action "order from water care dealer".

6. The method of claim 1 wherein the touch screen displays one or more of the following actions: water testing, reminders, supplier locaters, diagnose a problem, testing or contact.

7. The method of claim 1 wherein the customer creates a customer profile on the supplier-associated app once the supplier-associated app has been downloaded onto the mobile processor of the customer.

8. The method of claim 1 where the QR Code is scanned into the mobile processor of the customer when the customer purchases a water treatment product from the water care dealer.

9. The method of claim 1 where the QR Code is scanned into the mobile processor after the customer purchases a water care service from the water care dealer.

10. The method of claim 1 wherein the QR Code is part of a document supplied to the customer when the customer purchases a water care composition from the water care water care dealer.

11. The method of claim 1 wherein the water care dealer downloads the supplier-associated app onto the mobile processor of the customer.

12. The method of claim 1 wherein the downloading of the water care dealer QR Code onto the mobile processor of customer overrides any other water care dealer QR Code on the mobile processor of the customer.

13. The method of claim 1 where the supplier-associated app displays water care dealer locator on a touch screen of the mobile processor of the customer.

14. The method of claim 1 where the supplier-associated app displays water testing on a touch screen of the mobile processor of the customer.

15. The method of claim 1 where the supplier-associated app displays reminders on the touch screen of the mobile processor of the customer.

16. The method of claim 1 where the supplier-associated app displays water testing on the mobile processor of the customer.

17. The method of claim 1 where the supplier-associated app displays the name and address of the water care dealer on the mobile processor of the customer after the QR Code of the water care dealer has been scanned into the mobile processor of the customer.

\* \* \* \* \*

UNITED STATES PATENT AND TRADEMARK OFFICE
CERTIFICATE OF CORRECTION

PATENT NO. : 11,200,394 B1
APPLICATION NO. : 16/873774
DATED : December 14, 2021
INVENTOR(S) : Roseth et al.

It is certified that error appears in the above-identified patent and that said Letters Patent is hereby corrected as shown below:

In the Claims

Column 7, Line 12, "the water care water care dealer," should read --the water care dealer--

Signed and Sealed this
Third Day of September, 2024

Katherine Kelly Vidal
*Director of the United States Patent and Trademark Office*